(12) United States Patent
Sakayori et al.

(10) Patent No.: US 11,975,775 B2
(45) Date of Patent: May 7, 2024

(54) STEERING CONTROL DEVICE AND STEERING CONTROL METHOD

(71) Applicant: Hitachi Astemo, Ltd., Hitachinaka (JP)

(72) Inventors: Go Sakayori, Tokyo (JP); Hiroshi Nakano, Hitachinaka (JP); Yoshiji Hasegawa, Hitachinaka (JP); Tomoaki Fujibayashi, Hitachinaka (JP); Junya Takahashi, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 537 days.

(21) Appl. No.: 17/416,126

(22) PCT Filed: Aug. 22, 2019

(86) PCT No.: PCT/JP2019/032825
§ 371 (c)(1),
(2) Date: Jun. 18, 2021

(87) PCT Pub. No.: WO2020/158021
PCT Pub. Date: Aug. 6, 2020

(65) Prior Publication Data
US 2022/0073133 A1 Mar. 10, 2022

(30) Foreign Application Priority Data
Jan. 28, 2019 (JP) .................................. 2019-012085

(51) Int. Cl.
*B62D 6/00* (2006.01)
*B62D 7/15* (2006.01)
*B62D 15/02* (2006.01)

(52) U.S. Cl.
CPC ........... *B62D 6/002* (2013.01); *B62D 7/1509* (2013.01); *B62D 15/0285* (2013.01)

(58) Field of Classification Search
CPC ... B62D 6/002; B62D 7/1509; B62D 15/0285
See application file for complete search history.

(56) References Cited

U.S. PATENT DOCUMENTS 8,430,192 B2 4/2013 Gillett
10,245,937 B2 4/2019 Gillett
(Continued)

FOREIGN PATENT DOCUMENTS

JP S61-163063 A 7/1986
JP H08-091238 A 4/1996
(Continued)

OTHER PUBLICATIONS

International Search Report, PCT/JP2019/032825, dated Nov. 12, 2019 (1 pg.).
(Continued)

*Primary Examiner* — Kevin Hurley
*Assistant Examiner* — Marlon A Arce
(74) *Attorney, Agent, or Firm* — Volpe Koenig

(57) ABSTRACT

A steering control device for reducing a steering load on the driver by adjusting a gain of a rear wheel steering angle with respect to a front wheel steering angle operated by the driver according to a relative relationship between the vehicle and the parking frame to enable fine steering of the own vehicle near the parking frame when the four-wheel steering vehicle is parked. The steering control device is configured to control a rear wheel steering angle by a rear wheel steering system based on a front wheel steering angle operated by a driver, and includes an arithmetic device configured to reduce an absolute value of a gain of the rear wheel steering angle with respect to the front wheel steering angle as a positional relationship between an own vehicle and a parking frame comes closer when an own vehicle shifts to a parking driving mode.

12 Claims, 10 Drawing Sheets

(56) References Cited

U.S. PATENT DOCUMENTS

| | | | | |
|---|---|---|---|---|
| 2020/0189570 A1* | 6/2020 | Yamanaka | ............... | H04L 67/12 |
| 2020/0215977 A1* | 7/2020 | Onishi | ....................... | B60R 1/00 |
| 2023/0056227 A1* | 2/2023 | Kim | ......................... | B62D 7/14 |
| 2023/0227102 A1* | 7/2023 | Kim | ....................... | B62D 6/003 |
| | | | | 701/41 |

FOREIGN PATENT DOCUMENTS

| | | |
|---|---|---|
| JP | H08-287398 A | 11/1996 |
| JP | 2011-225019 A | 11/2011 |

OTHER PUBLICATIONS

Chinese Office Action dated Oct. 31, 2022 for Chinese Patent Application No. 201980085432.8.

\* cited by examiner

STEERING CONTROL DEVICE AND STEERING CONTROL METHOD

TECHNICAL FIELD

The present invention relates to a steering control device that performs steering control of rear wheels according to steering of front wheels of a vehicle.

BACKGROUND ART

As a four-wheeled vehicle or the like, a four-wheel steering type vehicle capable of steering not only the front wheels but also the rear wheels is known.

For example, the abstract of PTL 1 describes that "the ECU 40 of the steering control device 10 controls the steering angles of the left front wheel 21 to the right rear wheel 24 of the own vehicle 100. When the own vehicle 100 is not parallel to the parking frame P, the ECU 40 performs control so that the steering direction of the left front wheel 21 and the right front wheel 22 and the steering direction of the left rear wheel 23 and the right rear wheel 24 are in reverse phases being different directions. The reverse phase makes it easy to change the direction of the own vehicle 100, and makes it easy to make the own vehicle 100 parallel to the parking frame P. In addition, when the own vehicle 100 is parallel to the parking frame P, the ECU 40 performs control so that the steering direction of the left front wheel 21 and the right front wheel 22 and the steering direction of the left rear wheel 23 and the right rear wheel 24 are in the same phase being the same direction. The same phase makes it easy to move the own vehicle 100 in parallel while maintaining the direction of the own vehicle 100 and to adjust the left and right gaps between the own vehicle 100 and the parking frame P.".

CITATION LIST

Patent Literature

PTL 1: JP 2011-225019 A

SUMMARY OF INVENTION

Technical Problem

However, in PTL 1, since the steering control of the rear wheel with respect to the front wheel is not changed from the reverse-phase control to the same-phase control unless the own vehicle is parallel to the parking frame, there has been a problem that it is difficult to perform fine correction of the attitude of the vehicle in a period until the own vehicle becomes parallel to the parking frame. In addition, when the steering direction of the rear wheels is suddenly switched from the reverse phase to the same phase of the front wheels, the behavior of the vehicle at the time of steering is suddenly changed, so that there has also been a problem of giving the driver a sense of discomfort.

Thus, an object of the present invention is to provide a steering control device capable of reducing a steering load on the driver by gradually adjusting a gain of a rear wheel steering angle with respect to a front wheel steering angle operated by the driver according to a relative relationship between the own vehicle and the parking frame to enable fine steering of the own vehicle near the parking frame when the four-wheel steering vehicle is parked.

Solution to Problem

In order to solve the above problems, a vehicle steering control device of the present invention controls a rear wheel steering angle by a rear wheel steering system based on a front wheel steering angle operated by a driver, the steering control device including an arithmetic device configured to reduce an absolute value of a gain of the rear wheel steering angle with respect to the front wheel steering angle as a positional relationship between an own vehicle and a parking frame comes closer when an own vehicle shifts to a parking driving mode.

Advantageous Effects of Invention

According to the steering control device of the present invention, when a four-wheel steering vehicle is parked, the gain of the rear wheel steering angle with respect to the front wheel steering angle operated by the driver is gradually adjusted according to the relative relationship between the own vehicle and the parking frame, so that the own vehicle can be finely steered near the parking frame, and the steering load on the driver can be reduced.

DESCRIPTION OF EMBODIMENTS

Hereinafter, a steering control device according to embodiments of the present invention will be described with reference to the drawings.

First Embodiment

A steering control device 1 according to a first embodiment of the present invention will be described with reference to FIGS. 1 to 8.

Figure 1:
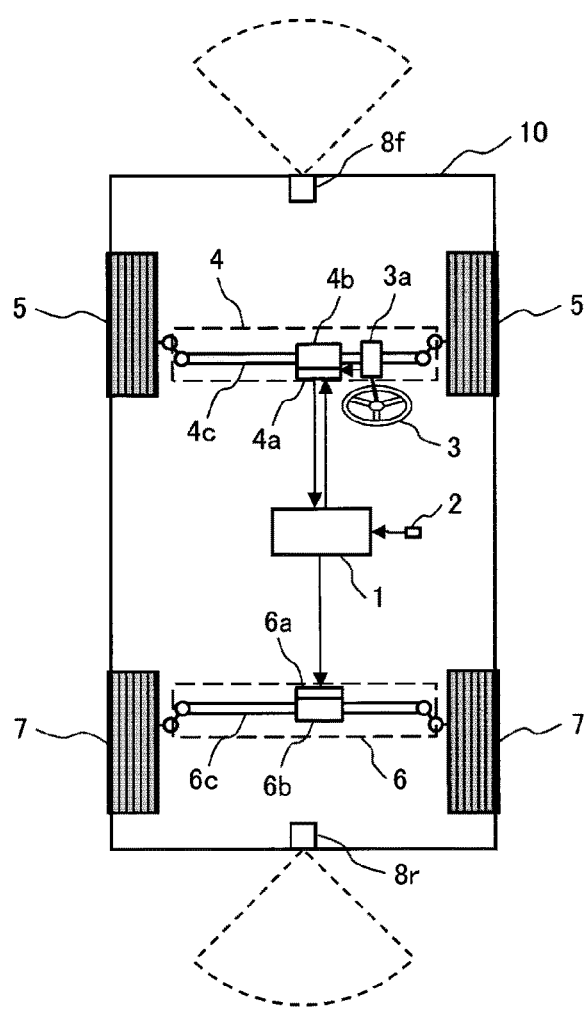
FIG. 1 is a schematic configuration diagram of a vehicle according to a first embodiment.

FIG. 1 is a schematic configuration diagram of a vehicle 10 mounting a steering control device 1 of the present embodiment. The vehicle 10 is a four-wheel steering (4WS) type vehicle capable of steering both the front wheels 5 and the rear wheels 7. When the vehicle travels at a normal speed, the front wheels 5 and the rear wheels 7 are steered in the same direction. However, when the vehicle travels at a low speed, the front and rear wheels can be independently steered in reverse phases, and the minimum rotation radius can be further reduced.

In addition to the steering control device 1, the vehicle 10 includes a vehicle state sensor 2 that acquires vehicle information such as vehicle speed information and shift lever information, a steering wheel 3 operated by a driver, a front wheel power steering device 4 that steers the front wheels 5, a rear wheel power steering device 6 that steers the rear wheels 7, a surrounding environment recognition sensor 8 (front recognition sensor 8f, rear recognition sensor 8r) that recognizes the surrounding environment of the vehicle 10, and a communication line (partially not shown) that connects these components. Then, the steering control device 1 receives signals from the vehicle state sensor 2 and the surrounding environment recognition sensor 8 via the communication line, and controls the front wheel power steering device 4 and the rear wheel power steering device 6 based on the received signals. It should be noted that the steering control device 1 is actually one function of an electronic control unit (ECU) including hardware such as an arithmetic device such as a CPU, a main storage device, an auxiliary storage device, and a communication device. Then, the arithmetic device executes the program loaded in the main storage device while referring to the database recorded in the auxiliary storage device, which achieves each function of the parking determination unit 1a and the like to be described below. Hereinafter, description will be made while appropriately omitting such a well-known technique.

The front wheel power steering device 4 includes a steering sensor 3a (steering angle sensor, torque sensor, and the like) that detects the steering direction and steering torque of the steering wheel 3 by the operation of the driver, a front wheel rack shaft 4c connected to the front wheels 5 via a link, a front wheel power steering motor 4b that applies steering thrust to the front wheel rack shaft 4c, and a front wheel steering angle control unit 4a that gives a torque command to the front wheel power steering motor 4b based on a detection value (hereinafter, referred to as a "front wheel steering angle $\delta_f$") of the steering sensor 3a. Thus, the front wheel power steering device 4 causes the front wheel power steering motor 4b to generate steering thrust according to the steering of the steering wheel 3 by the driver, and assists the steering of the front wheels 5.

The rear wheel power steering device 6 includes a rear wheel rack shaft 6c connected to the rear wheels 7 via a link, a rear wheel power steering motor 6b that applies steering thrust to the rear wheel rack shaft 6c, and a rear wheel steering angle control unit 6a that gives a torque command to the rear wheel power steering motor 6b based on a command value (hereinafter, referred to as a "rear wheel steering angle $\delta_r$") from the steering control device 1. Thus, the rear wheel power steering device 6 causes the rear wheel power steering motor 6b to generate steering thrust according to the command value from the steering control device 1, and steers the rear wheels 7. It should be noted that the relationship between the front wheel steering angle $\delta_f$ and the rear wheel steering angle $\delta_r$ will be described below.

Furthermore, the surrounding environment recognition sensor 8 (front recognition sensor 8f, rear recognition sensor 8r) processes image data and the like captured by the stereo camera to recognize an obstacle, a parking frame, and the like around the vehicle 10. It should be noted that the surrounding environment recognition sensor 8 may be provided on the lateral side of the vehicle to recognize not only the front and the rear but also the side. In addition, the parking frame recognized by the surrounding environment recognition sensor 8 may be not only a region surrounded by a white line designated as a parking lot but also a region where the vehicle 10 can be parked, such as an empty space between other vehicles or an empty space surrounded by a wall.

Next, details of the steering control of the rear wheels 7 by the steering control device 1 will be described with reference to FIGS. 2 to 8.

Figure 2:
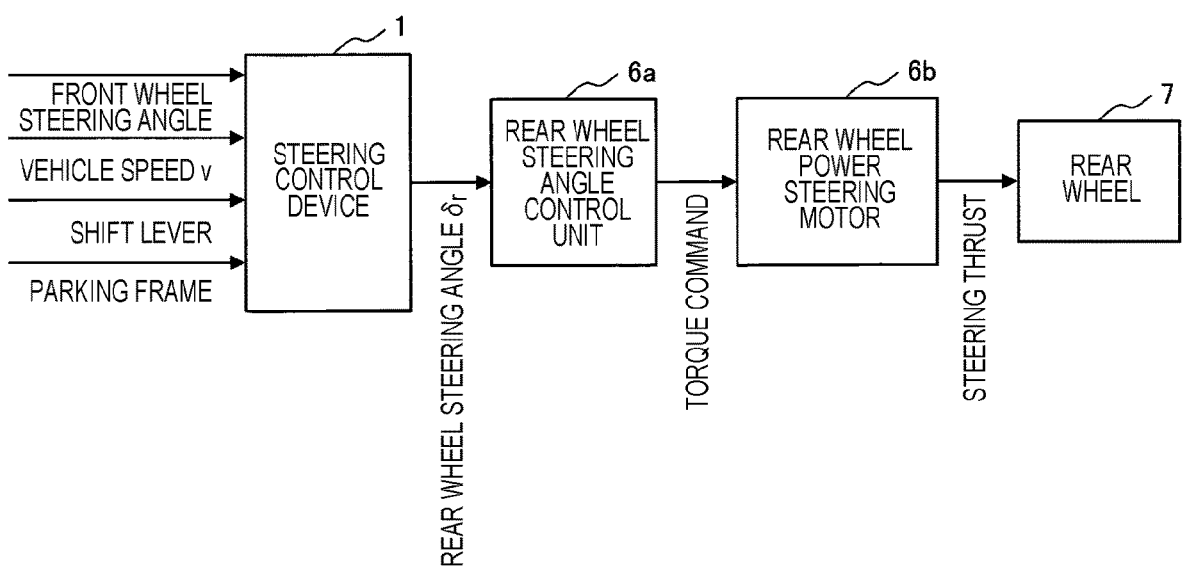
FIG. 2 is a schematic diagram of a rear wheel steering system according to the first embodiment.

As shown in the schematic diagram of the rear wheel steering system in FIG. 2, a rear wheel steering angle control unit 6a and a rear wheel power steering motor 6b are mainly disposed between the steering control device 1 and the rear wheels 7. The steering control device 1 is input with each piece of information of front wheel steering angle information from the steering sensor 3a, vehicle information (vehicle speed information, shift lever information) from the vehicle state sensor 2, and parking frame information from the surrounding environment recognition sensor 8 or the outside of the vehicle (for example, a management system of a parking facility). Then, the steering control device 1 calculates a predetermined rear wheel steering angle $\delta_r$ based on these pieces of input information, and gives the obtained rear wheel steering angle $\delta_r$ to the rear wheel steering angle control unit 6a. The rear wheel steering angle control unit 6a generates a torque command according to the difference between the input rear wheel steering angle δr and the actual rear wheel steering angle, and the like, and gives the torque command to the rear wheel power steering motor 6b to generate desired steering thrust to change the direction of the rear wheels 7, thereby controlling the traveling direction of the vehicle 10.

Figure 3:
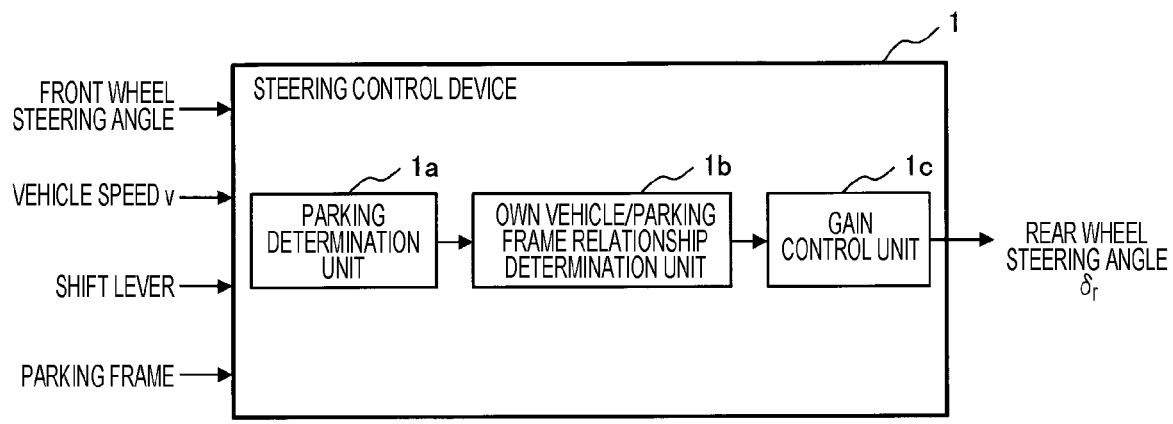
FIG. 3 is a functional block diagram of a steering control device according to the first embodiment.

FIG. 3 is a functional block diagram showing details of the steering control device 1. As shown here, the steering control device 1 includes a parking determination unit 1a, an own vehicle/parking frame relationship determination unit 1b, and a gain control unit 1c. First, the parking determination unit 1a determines whether the driving mode of the vehicle 10 is the parking driving mode. Then, when it is determined as the parking mode, the own vehicle/parking frame relationship determination unit 1b calculates the relationship between the vehicle 10 and the parking frame 9, and the gain control unit 1c determines the rear wheel steering angle $\delta_r$ based on the information calculated by the own vehicle/parking frame relationship determination unit 1b. Hereinafter, detailed processing in each unit of the steering control device 1 will be described with reference to FIGS. 4 to 8.

<Parking Determination Unit 1a>

The method for determining the driving mode of the vehicle 10 by the parking determination unit 1a includes a method of determining by a driver trigger and a method of determining based on vehicle information. The method by the driver trigger is a method of determining that the driving mode is switched to the parking driving mode when the driver indicates an intention to start parking to the vehicle 10, such as when the driver presses a parking start button.

On the other hand, the method based on the vehicle information is a method of determining that the driving mode is switched to the parking driving mode based on the vehicle information (vehicle speed information, shift lever information) input from the vehicle state sensor 2. An example of this is shown in the flowchart in FIG. 4.

First, in step S1, the parking determination unit 1a acquires vehicle information (vehicle speed information, shift lever information) necessary for determination of the driving mode from the vehicle state sensor 2.

Next, in step S2, the parking determination unit 1a determines whether the vehicle 10 travels at an extremely low speed (for example, 5 km/h or less) based on the acquired vehicle speed information. When the vehicle does not travel at an extremely low speed, it is determined as the normal driving mode, and then the processing is ended. When the vehicle travels at an extremely low speed, the process proceeds to step S3.

Next, in step S3, the parking determination unit 1a checks the position of the shift lever based on the acquired shift lever information. In a parking pattern such as parallel parking or reverse parking, the vehicle 10 often repeats forward movement and backward movement, and the shift lever enters "R" (Reverse) at least once. Based on these characteristics, the time transition of the shift lever position is observed, and when the shift lever does not enter "R" for a certain period of time or more, it is determined that the driving mode is the normal driving mode, and the processing is ended. On the other hand, when the shift lever enters "R" even once within a certain period of time, it is determined that the driving mode is the parking driving mode, and the processing is ended.

Figure 4:
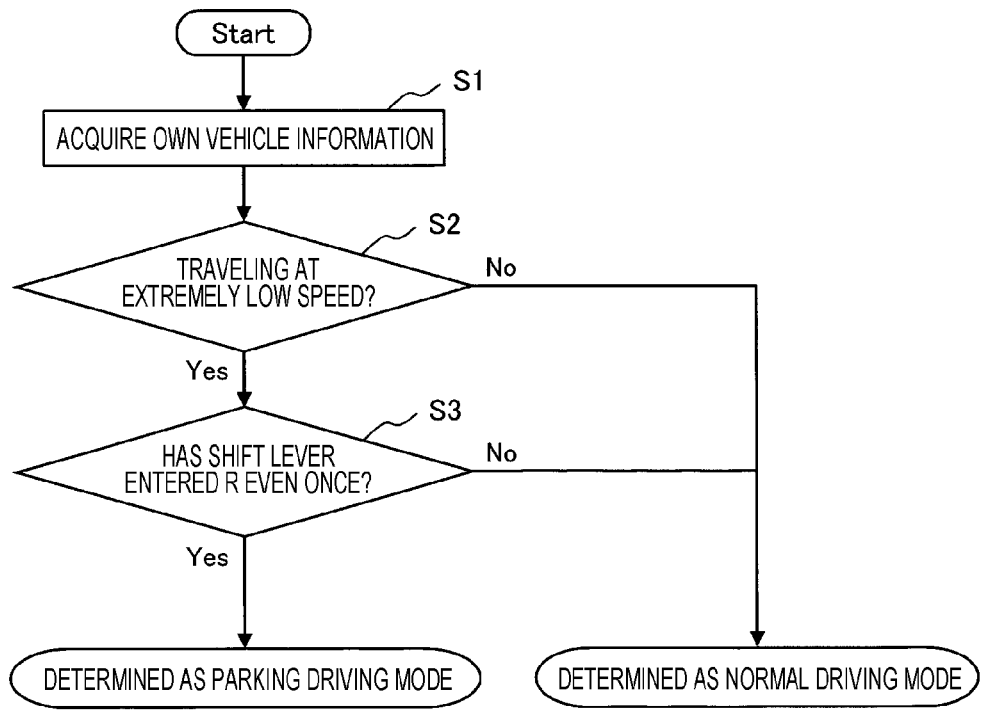
FIG. 4 is an operation flowchart of a parking determination unit of the steering control device according to the first embodiment.

It should be noted that the flowchart in FIG. 4 is an example of a method of determining the driving mode using the vehicle information, and the determination may be made using vehicle information other than the vehicle speed information and the shift lever information. For example, when the driving mode is determined, a temporal change in a front wheel steering angle, an accelerator pedal, a brake pedal, or the like may be used in combination. In addition, the driving mode may be estimated based on a surrounding situation detected by the surrounding environment recognition sensor 8 or map data (for example, the vehicle 10 is in a parking area).

<Own Vehicle/Parking Frame Relationship Determination Unit 1b>

Figure 5:
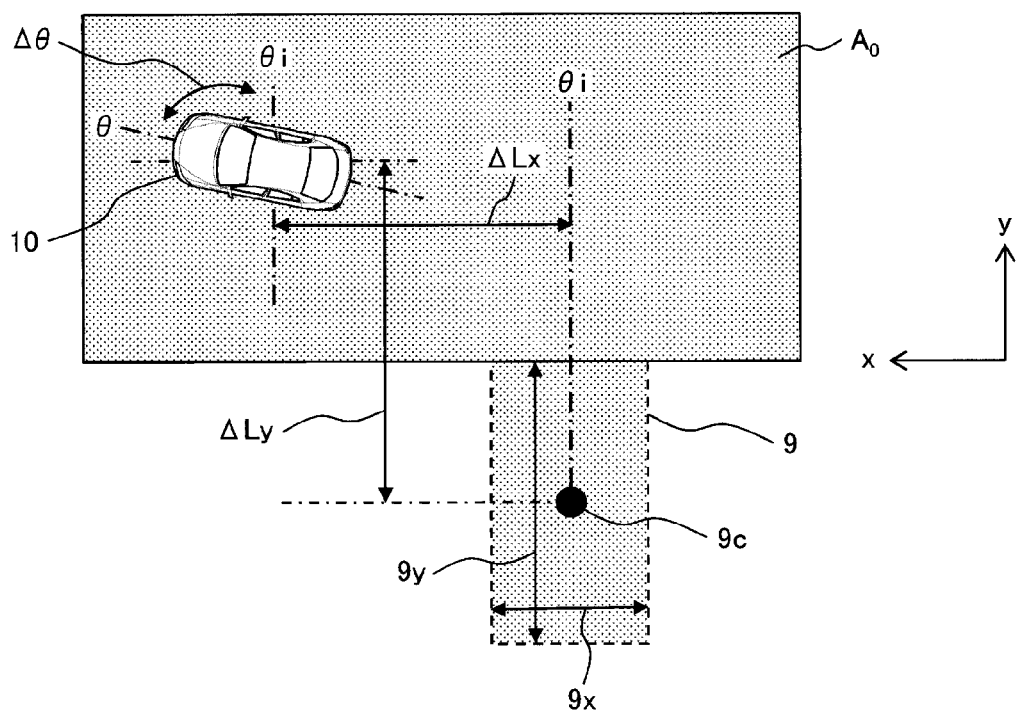
FIG. 5 is a plan view for illustrating a relationship between a vehicle and a parking frame according to the first embodiment.

Next, the relationship between the vehicle 10 and the parking frame 9 calculated by the own vehicle/parking frame relationship determination unit 1b will be described with reference to FIG. 5. FIG. 5 is a diagram showing a state in which the vehicle 10 is halfway to be parked in a rectangular parking frame 9 indicated by a dotted line, in which a short direction (lateral direction) of the parking frame 9 is the x direction and a long direction (front-rear direction) is the y direction. First, the own vehicle/parking frame relationship determination unit 1b grasps the position and shape of the parking frame 9 based on the parking frame information received from the surrounding environment recognition sensor 8 or outside the vehicle. The parking frame 9 grasped by the own vehicle/parking frame relationship determination unit 1b is defined by its central coordinates $9_C$, an ideal attitude angle $\theta_i$ at the time of parking, an x-direction distance $9_x$, and a y-direction distance $9_y$. The relationship between the vehicle 10 and the parking frame 9 is represented by the attitude angle difference $\Delta\theta$ between the attitude angle $\theta$ of the vehicle 10 and the ideal attitude angle $\theta_i$, the x-direction distance $\Delta L_x$ between the vehicle 10 and the central coordinates $9_C$ of the parking frame 9, and the y-direction distance $\Delta L_y$ between the vehicle 10 and the central coordinates $9_C$ of the parking frame 9. It should be noted that when the attitude angle difference $\Delta\theta$ and the distances between the vehicle 10 and the parking frame 9 are defined, the reference point of the vehicle 10 is assumed to be a vehicle center point. In addition, in FIG. 5, the x-direction distance $\Delta L_x$ and the y-direction distance $\Delta L_y$ are expressed by the relationship between the vehicle 10 and the central coordinates $9_C$ of the parking frame, but may be expressed by the relationship between the vehicle 10 and the points constituting the parking frame 9.

<Gain Control Unit 1c>

The relationship between the vehicle 10 and the parking frame 9 is calculated by the own vehicle/parking frame relationship determination unit 1b, and then the gain of the rear wheel steering angle $\delta_r$ with respect to the front wheel steering angle $\delta_f$ is adjusted by the gain control unit 1c. A gain adjustment method by the gain control unit 1c will be described with reference to FIGS. 5 to 8.

The gain control unit 1c starts the following gain adjustment control when the x-direction distance $\Delta L_x$ or the y-direction distance $\Delta L_y$ between the vehicle 10 and the parking frame 9 falls within a threshold value, for example, when the vehicle 10 is located in a rectangular region $A_0$ shown in FIG. 5.

Figure 6:
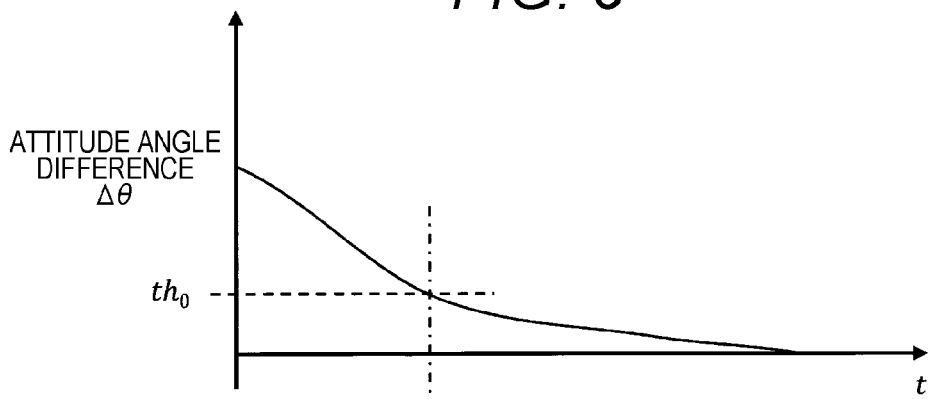
FIG. 6 is a conceptual diagram of gain adjustment according to the first embodiment.

As shown in the graph in FIG. 6, when the attitude angle difference $\Delta\theta$ is equal to or larger than the predetermined threshold value $th_0$, the gain control unit 1c controls the gain of the rear wheel steering angle $\delta_r$ with respect to the front wheel steering angle $\delta_f$ to be constant. In this case, steering the rear wheels 7 in a direction opposite to the front wheels 5 (reverse phase) as in a conventional manner allows the minimum rotation radius of the vehicle to be reduced and makes the yaw motion easy. Thus, the attitude angle of the vehicle greatly changes, and the attitude angle difference $\Delta\theta$ greatly decreases.

On the other hand, when the attitude angle difference $\Delta\theta$ becomes equal to or smaller than the threshold value (that is, when the attitude angle $\theta$ of the vehicle 10 approaches the ideal attitude angle $\theta 1$), the gain of the rear wheel steering angle $\delta_r$ with respect to the front wheel steering angle $\delta_f$ is varied according to the magnitude of the attitude angle difference $\Delta\theta$. Specifically, as shown in FIG. 6, as the attitude angle difference $\Delta\theta$ decreases, the absolute value of the gain approaches 0.

Figure 7:
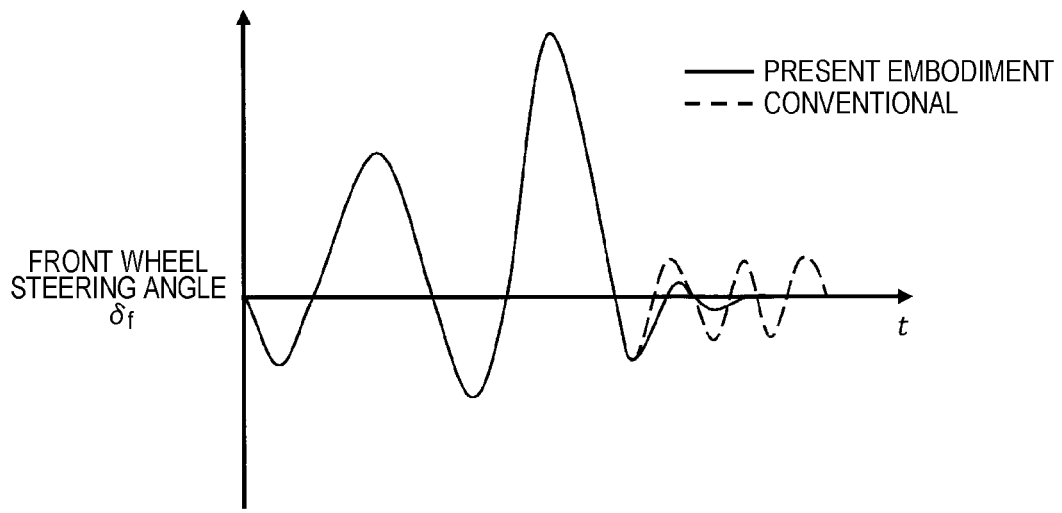
FIG. 7 is an example of temporal transition of a front wheel steering angle according to the first embodiment.

Thus, the rear wheel steering angle $\delta_r$ is small as compared with the conventional control in which the gain is constant regardless of the attitude angle difference $\Delta\theta$, and the yaw motion of the vehicle 10 is less likely to occur. As a result, it becomes easy for the driver to change the attitude angle $\theta$ of the vehicle 10 by a minute amount, and as shown in FIG. 7, reducing the correction steering angle by the driver near the parking frame and making the steering frequency low near the parking frame allows the steering load on parking by the driver to be reduced.

It should be noted that in FIG. 6, the gain of the rear wheel steering angle $\delta_r$ with respect to the front wheel steering angle $\delta_f$ is adjusted according to the magnitude of the attitude angle difference $\Delta\theta$, but the gain may be adjusted also in consideration of the x-direction distance $\Delta L_x$ and the y-direction distance $\Delta L_y$. However, in this case, if the gain is set with the attitude angle difference $\Delta\theta$ in preference to the x-direction distance $\Delta L_x$ and the y-direction distance $\Delta L_y$, it is possible to achieve steering more in line with the sense of the driver.

Figure 8:
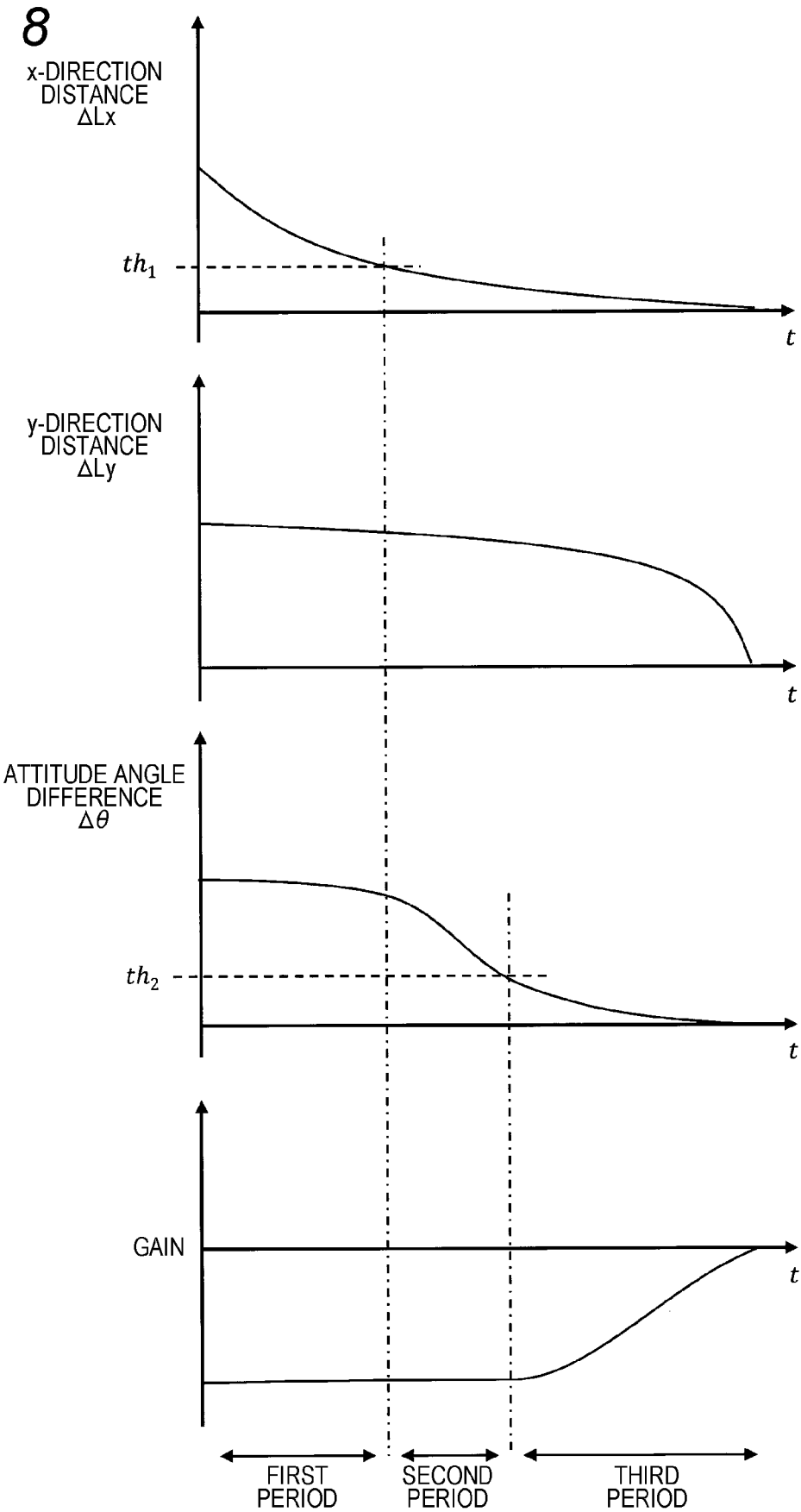
FIG. 8 is a specific example of a relationship between $\Delta L_x$, $\Delta L_y$, $\Delta \theta$, and a gain at the time of vehicle parking according to the first embodiment.

FIG. 8 illustrates temporal transition of an x-direction distance $\Delta L_x$, a y-direction distance $\Delta L_y$, an attitude angle difference $\Delta\theta$, and a gain when the vehicle 10 is parked in the parking frame 9 shown in FIG. 5.

First, in the first period (period in which the x-direction distance $\Delta L_x$ is larger than $th_1$), the driver operates the steering wheel 3 so as to gradually decrease the attitude angle difference $\Delta\theta$ while decreasing the x-direction distance $\Delta L_x$.

Next, in the second period (period in which the attitude angle difference $\Delta\theta$ is larger than $th_2$), the attitude angle difference $\Delta\theta$ is rapidly decreased by largely changing the attitude angle $\theta$ of the vehicle 10 while gradually decreasing the x-direction distance $\Delta L_x$ and the y-direction distance $\Delta L_y$.

In the first period and the second period, the gain is assumed to be constant and to be set to a conventional value.

Finally, in the third period (period in which the attitude angle difference $\Delta\theta$ is smaller than $th_2$), the driver brings the y-direction distance $\Delta L_y$ close to 0 while finely correcting the attitude angle difference $\Delta\theta$. In this period, the gain control unit 1*c* makes the gain of the rear wheel steering angle $\delta_r$ with respect to the front wheel steering angle $\delta_f$ close to zero, whereby a minute attitude angle change can be made, and the steering load on parking by the driver can be reduced.

As described above, according to the steering control device of the present embodiment, when the four-wheel steering vehicle is parked, the gain of the rear wheel steering angle $\delta_r$ with respect to the front wheel steering angle $\delta_f$ operated by the driver is gradually adjusted according to the relative relationship between the own vehicle and the parking frame, so that the own vehicle can be finely steered near the parking frame, and the steering load on the driver can be reduced.

Second Embodiment

Next, a steering control device 1 according to a second embodiment of the present invention will be described with reference to FIGS. 9 to 11B. It should be noted that overlapping description is omitted for the common points with the first embodiment.

Figure 9:
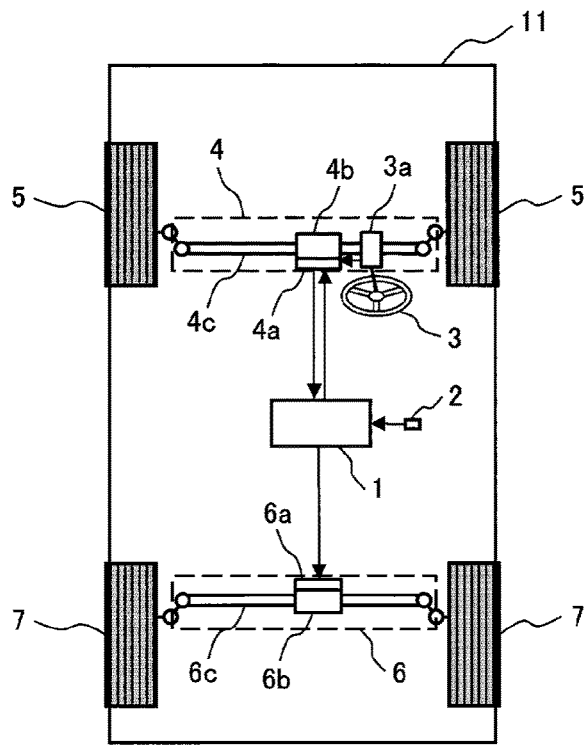
FIG. 9 is a schematic configuration diagram of a vehicle according to a second embodiment.
Figure 10:
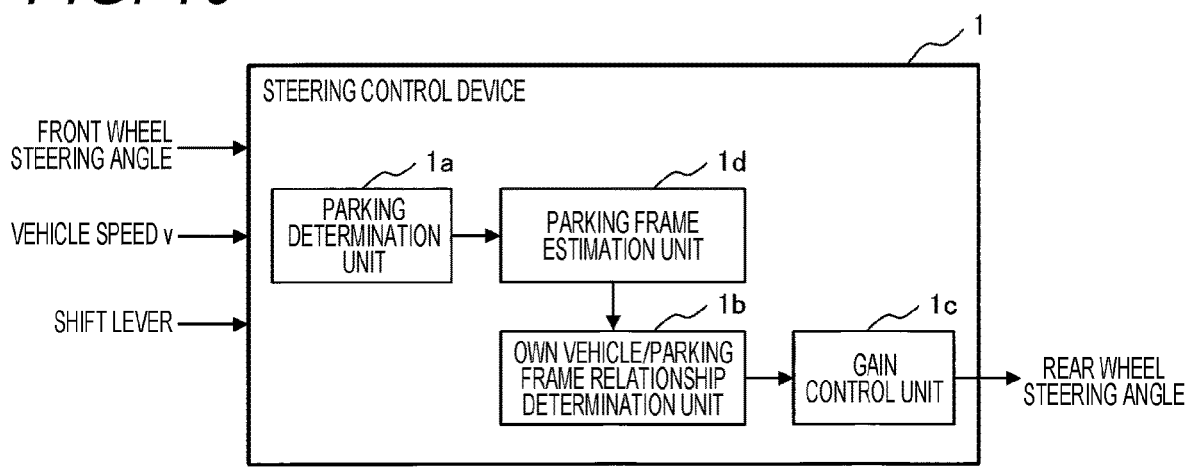
FIG. 10 is a functional block diagram of a steering control device according to the second embodiment.

The vehicle 10 of the first embodiment includes the surrounding environment recognition sensor 8 to recognize the parking frame 9, but the vehicle 11 of the present embodiment does not include the surrounding environment recognition sensor 8 as shown in FIG. 9. Therefore, as shown in FIG. 10, the parking frame information is not input into the steering control device 1 of the present embodiment unlike in the first embodiment, but the each piece of information of the front wheel steering angle information, the vehicle speed information, and the shift lever information is input as in the first embodiment.

Thus, in the steering control device 1 of the present embodiment, in order that the same effect as in the first embodiment can be obtained even without the input of the parking frame information, a parking frame estimation unit 1*d* is added, and the rear wheel steering angle $\delta_r$ is determined based on the relative relationship between the parking frame estimated here and the own vehicle. It should be noted that since the action of the parking determination unit 1*a*, the own vehicle/parking frame relationship determination unit 1*b*, and the gain control unit 1*c* is the same as that of the first embodiment, the description overlapping with the first embodiment will be omitted below.

The operation of the parking frame estimation unit 1*d* of the present embodiment will be described with reference to FIGS. 11A and 11B.

Figure 11A:
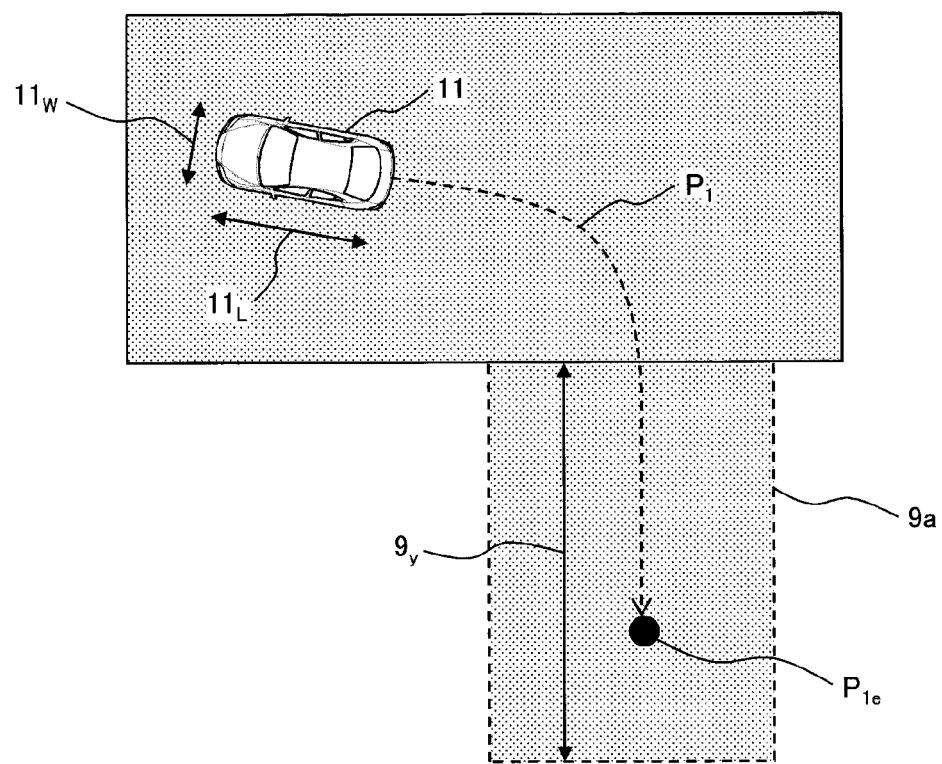
FIG. 11A is a plan view for illustrating a relationship between a vehicle and a parking frame according to the second embodiment.

When the parking determination unit 1*a* detects the shift to the parking driving mode, the parking frame estimation unit 1*d* first estimates the prediction route $P_1$ of the vehicle 11 based on the front wheel steering angle $\delta_f$, the steering angular velocity $\omega$, and the vehicle speed v as shown in FIG. 11A. Here, the steering angular velocity $\omega$ is obtained by time-differentiating the front wheel steering angle $\delta_f$. Next, the parking frame estimation unit 1*d* estimates the parking frame 9*a* based on the estimated prediction route $P_1$. As an example, the estimated route end point $P_{1e}$ is set as the center point of the parking frame 9*a*, and adding or subtracting those obtained by adding margins to the total length $11_L$ and the total width $11_W$ of the vehicle 11 to or from the parking frame center point (estimated route end point $P_{1e}$) allows the parking frame 9*a* to be estimated. It should be noted that when it is difficult to estimate the y-direction distance $9_y$ of the parking frame 9*a* from the vehicle speed v, the estimation may not be performed.

Figure 11B:
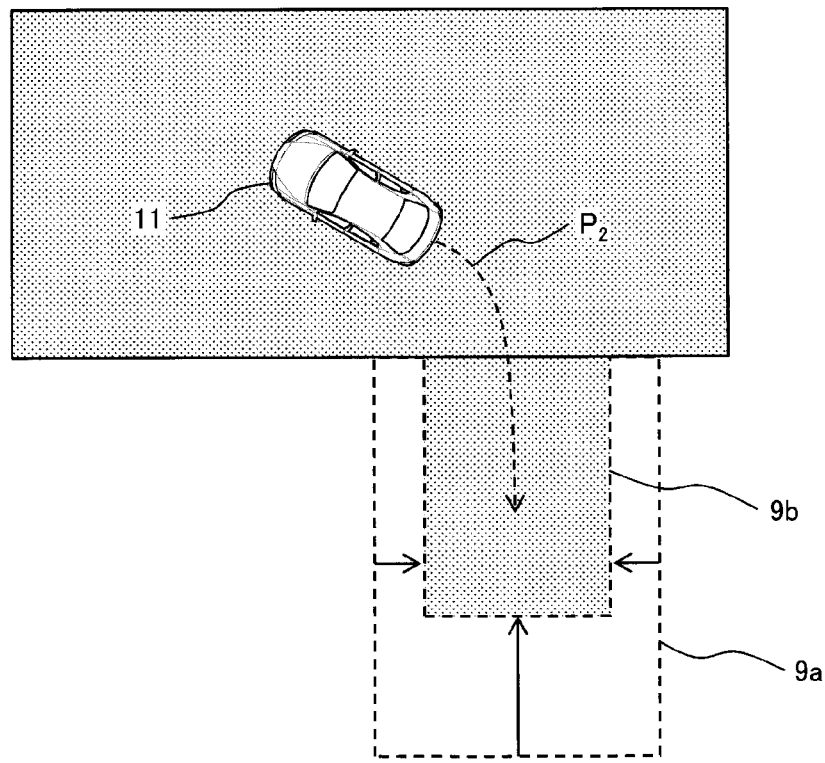
FIG. 11B is a plan view for illustrating a relationship between a vehicle and a parking frame according to the second embodiment.

When the vehicle 11 approaches the estimated parking frame 9*a* and further decelerates, as shown in FIG. 11B, the estimation accuracy by the parking frame estimation unit 1*d* is improved, so that the margin amount to be added to the total length $11_L$ and the total width $11_W$ of the vehicle 11 may be set to a smaller value. Thus, it is considered that the parking frame 9*b* estimated at the end of parking is smaller than the parking frame 9*a* estimated at the start of parking, and the parking frame 9*b* is closer to the actual parking frame 9.

As described above, according to the steering control device of the present embodiment, even in the vehicle not including the surrounding environment recognition sensor 8, the gain of the rear wheel steering angle $\delta_r$ with respect to the front wheel steering angle $\delta_f$ operated by the driver is gradually adjusted according to the relative relationship between the own vehicle and the parking frame, so that the own vehicle can be finely steered near the parking frame, and the steering load on the driver can be reduced.

Third Embodiment

Figure 12:
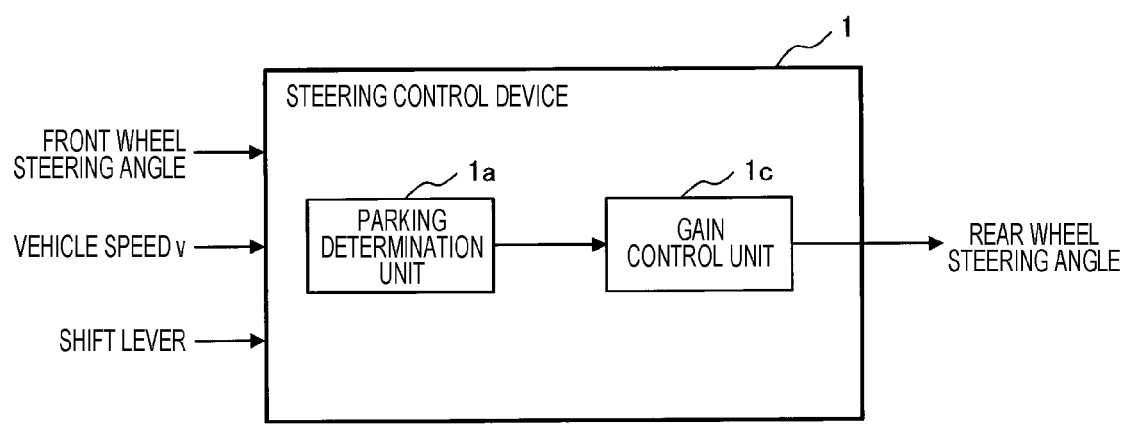
FIG. 12 is a functional block diagram of a steering control device according to a third embodiment.

Next, a steering control device 1 according to a third embodiment of the present invention will be described with reference to FIGS. 12 to 14. It should be noted that overlapping description is omitted for the common points with the second embodiment.

The own vehicle/parking frame relationship determination unit 1*b* performs calculation, based on the parking frame or the like recognized by the surrounding environment recognition sensor 8 in the first embodiment, and based on the parking frame estimated by the parking frame estimation unit 1*d* in the second embodiment, and the gain control unit 1*c* sets an appropriate gain value based on the calculation result, but in the present embodiment, the gain control unit 1*c* sets an appropriate gain without using the parking frame information from the surrounding environment recognition sensor 8 or the parking frame estimation unit 1*d*.

Therefore, when the parking determination unit 1a detects the shift to the parking driving mode, the gain control unit 1c adjusts the gain of the rear wheel steering angle $\delta_r$ with respect to the front wheel steering angle $\delta_f$ based on the temporal transition information on the vehicle speed v, the front wheel steering angle $\delta_f$, and the steering angular velocity ω. The detailed procedure will be described with reference to FIGS. 13 and 14.

Figure 13:
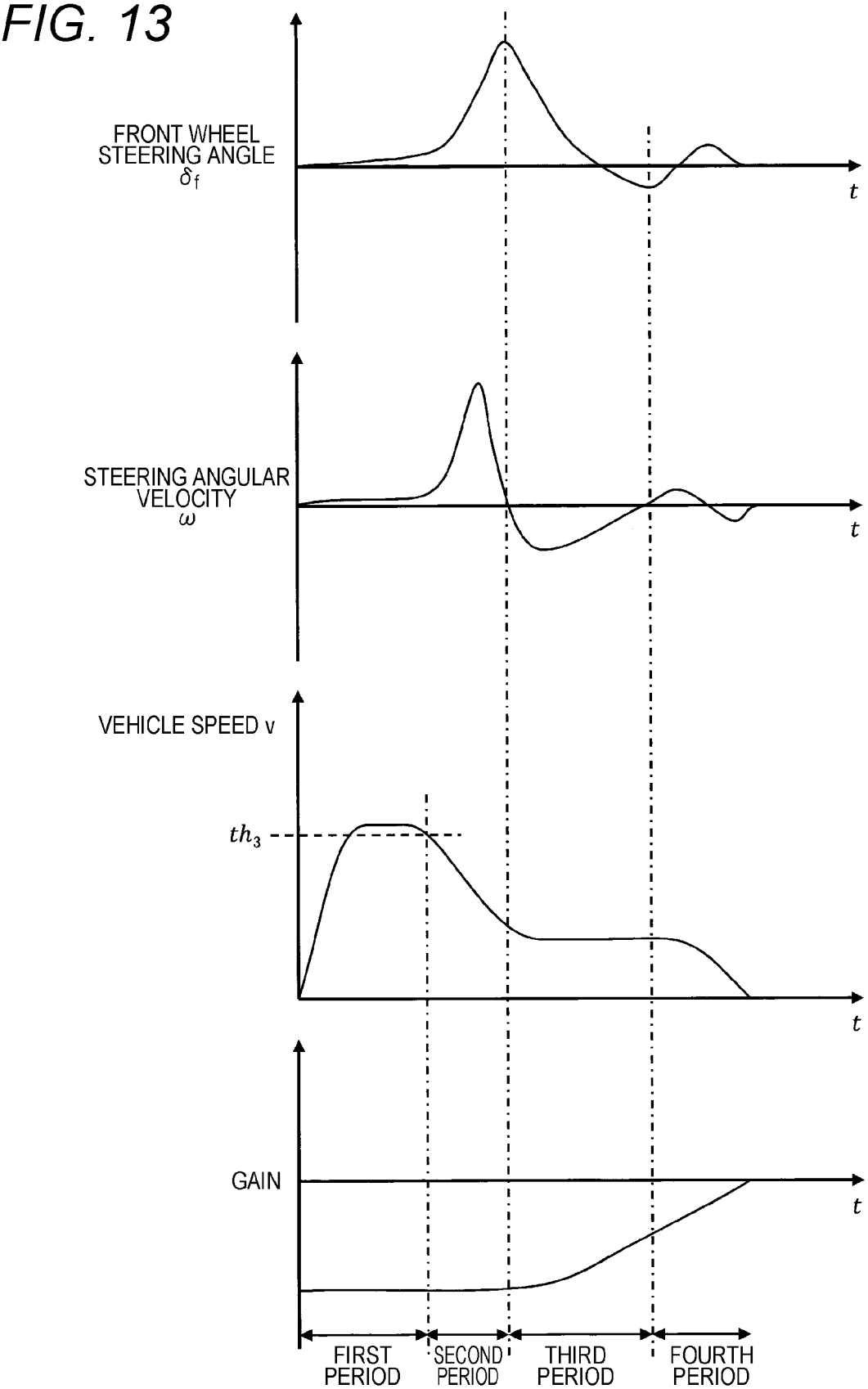
FIG. 13 is a specific example of a relationship between $\delta_f$, $\omega$, $v$, and a gain at the time of vehicle parking according to the third embodiment.
Figure 14:
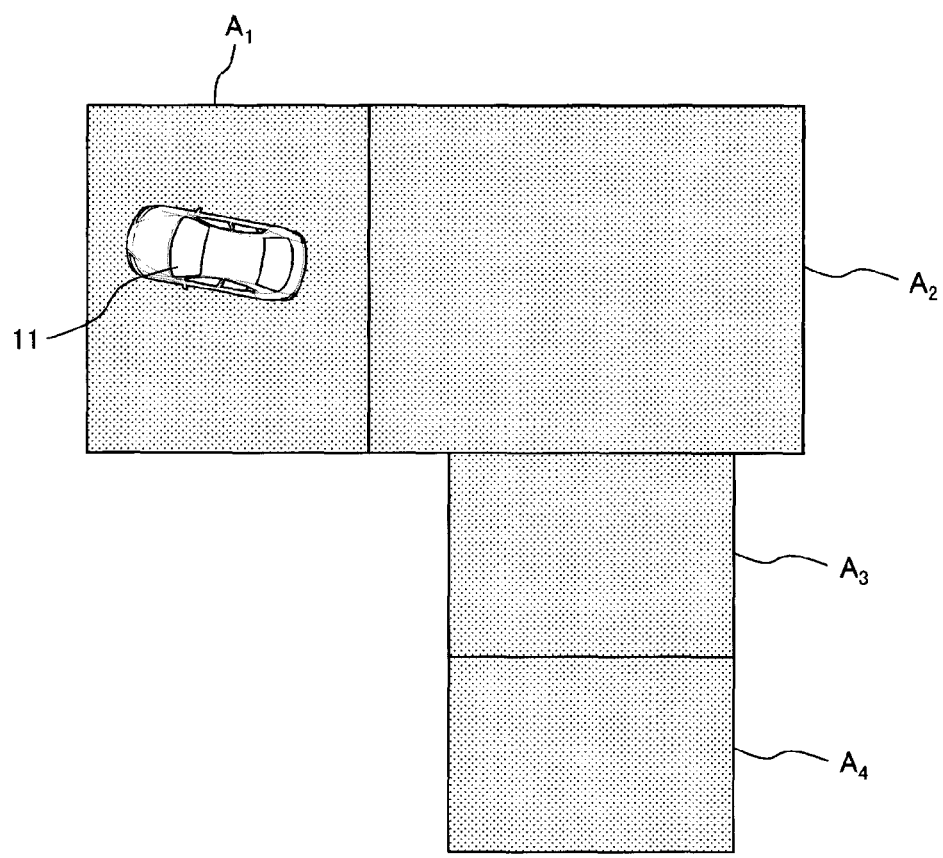
FIG. 14 is a plan view for illustrating a relationship between a vehicle and a parking frame according to the third embodiment.

FIG. 13 shows an example of a parking pattern by the driver.

In the first period (period until vehicle speed v decreases to or below the threshold value $th_3$ determined by the relationship with the maximum speed during the parking driving mode), the operation of the steering wheel 3 is started so that the attitude of the vehicle 11 changes at the same time as the vehicle speed v is increased from the stop time. An example of the driver performing this operation includes within a region $A_1$ in FIG. 14 away from the region where the driver intends to park.

In the second period (the period from the start of deceleration of the vehicle speed v to the zero-crossing of the steering angular velocity ω), in order to secure the yaw motion of the vehicle 11, the driver steers the steering wheel 3 largely and starts to decelerate. At this time, as shown in FIG. 13, the steering angular velocity ω takes a positive value. An example in which the driver performs this operation includes within the region A2 in FIG. 14.

It should be noted that when it is determined that the vehicle is in the middle of changing its attitude more greatly than the temporal transition of the vehicle speed v, the front wheel steering angle $\delta_f$, and the steering angular velocity ω, that is, when it is determined that the period corresponds to the first period and the second period in FIG. 13, it is considered that minute correction of the steering of the vehicle 11 is not necessary yet. Therefore, the gain of the rear wheel steering angle $\delta_r$ with respect to the front wheel steering angle $\delta_f$ is set to be constant as in the normal traveling.

In the third period (the period from the zero crossing of the steering angular velocity ω to the zero crossing again), the turning back operation of the steering wheel 3 is performed while maintaining the vehicle speed v so that the attitude angle θ of the vehicle 11 converges to the ideal attitude angle $θ_i$. An example in which the driver performs this steering includes within the region A3 in FIG. 14. In this region, when it is determined that the attitude angle of the vehicle is not greatly changed by comparing the temporal transition of the vehicle speed v, the front wheel steering angle $\delta_f$, and the steering angular velocity ω, and the positive and negative of the steering angle and the steering angular velocity ω, the gain of the rear wheels with respect to the front wheels is gradually decreased from the initial value.

In the fourth period (period at and after the time when the steering angular velocity ω crosses zero again), in order to finely correct the attitude angle θ of the vehicle 11, the driver brings the vehicle speed v close to 0 while performing minute steering. The minute steering is not necessarily performed in one direction, and may be continuously performed in both directions as shown in FIG. 13. An example in which the driver performs this steering includes within the region $A_4$ in FIG. 14. In this region, the absolute value of the gain of the rear wheel steering angle $\delta_r$ with respect to the front wheel steering angle $\delta_f$ is brought close to 0 from the temporal transition of the vehicle speed v, the front wheel steering angle, and the steering angular velocity ω. As a result, control close to two-wheel steering is performed at the end of parking, the attitude angle of the vehicle is less likely to be changed, and the steering load on the driver is reduced.

As described above, according to the steering control device of the present embodiment, even when the parking frame information is not used, since the gain of the rear wheel steering angle $\delta_r$ with respect to the front wheel steering angle $\delta_f$ operated by the driver is gradually adjusted according to the behavior of the vehicle, it is possible to finely steer the own vehicle, and it is possible to reduce the steering load on the driver.

It should be noted that the present invention is not limited to each of the embodiments described above, and includes various modifications. For example, the above-described embodiments have been described in detail for easy understanding of the present invention, and are not necessarily limited to those having all the configurations.

REFERENCE SIGNS LIST 1 steering control device
1a parking determination unit
1b own vehicle/parking frame relationship determination unit
1c gain control unit
1d parking frame estimation unit
2 vehicle state sensor
3 steering wheel
3a steering sensor
4 front wheel power steering device
4a front wheel steering angle control unit
4b front wheel power steering motor
4c front wheel rack shaft
5 front wheel
6 rear wheel power steering device
6a rear wheel steering angle control unit
6b rear wheel power steering motor
6c rear wheel rack shaft
7 rear wheel
8 surrounding environment recognition sensor
8f front recognition sensor
8r rear recognition sensor
9, 9a, 9b, 9c parking frame
10, 11 vehicle

The invention claimed is:

1. A steering control device of a vehicle, the steering control device configured to control a rear wheel steering angle by a rear wheel steering system based on a front wheel steering angle operated by a driver, the steering control device comprising an arithmetic device configured to reduce an absolute value of a gain of the rear wheel steering angle with respect to the front wheel steering angle as a positional relationship between an own vehicle and a parking frame comes closer when an own vehicle shifts to a parking driving mode.

2. The steering control device according to claim 1, wherein the gain is a value of 0 or less.

3. The steering control device according to claim 1, wherein the positional relationship includes an attitude angle difference between an own vehicle and a parking frame.

4. The steering control device according to claim 3, wherein the positional relationship includes a front-rear direction distance or a lateral direction distance between an own vehicle and a parking frame.

5. The steering control device according to claim 4, wherein an absolute value of the gain is set by prioritizing the attitude angle difference over the front-rear direction distance or the lateral direction distance.

6. The steering control device according to claim 1, wherein the parking frame is recognized based on information from a surrounding environment recognition sensor configured to recognize a surrounding environment of the vehicle.

7. The steering control device according to claim 1, wherein the parking frame is estimated based on temporal transition information on the front wheel steering angle or a steering angular velocity and a vehicle speed.

8. The steering control device according to claim 1, wherein the parking frame is recognized based on parking frame information received from outside a vehicle.

9. A steering control device of a vehicle, the steering control device configured to control a rear wheel steering angle by a rear wheel steering system based on a front wheel steering angle operated by a driver, the steering control device comprising an arithmetic device configured to reduce an absolute value of a gain of a rear wheel steering angle with respect to the front wheel steering angle based on temporal transition information on the front wheel steering angle or a steering angular velocity when an own vehicle shifts to a parking driving mode.

10. The steering control device according to claim 9, wherein the arithmetic device reduces an absolute value of a gain of a rear wheel steering angle with respect to the front wheel steering angle based on temporal transition information on a vehicle speed.

11. The steering control device according to claim 10, wherein the arithmetic device reduces an absolute value of a gain of a rear wheel steering angle with respect to the front wheel steering angle based on a steering angle and a steering angular velocity in a correction steering section in which a vehicle speed is extremely low and a turning back operation of a steering wheel is performed.

12. A steering control method for a vehicle, the steering control method of controlling a rear wheel steering angle by a rear wheel steering system based on a front wheel steering angle operated by a driver, the steering control method comprising reducing an absolute value of a gain of the rear wheel steering angle with respect to the front wheel steering angle as a positional relationship between an own vehicle and a parking frame comes closer when an own vehicle shifts to a parking driving mode.

\* \* \* \* \*